(12) United States Patent
Van Schmus et al.

(10) Patent No.: US 6,485,223 B1
(45) Date of Patent: Nov. 26, 2002

(54) CASTER-CAMBER PLATE ASSEMBLY

(75) Inventors: Ehren W. Van Schmus, San Luis Obispo, CA (US); Charles G. Schwynoch, San Luis Obispo, CA (US)

(73) Assignee: Maximum Motorsports, San Luis, Obispo, CA (US)

( * ) Notice: Subject to any disclaimer, the term of this patent is extended or adjusted under 35 U.S.C. 154(b) by 0 days.

(21) Appl. No.: 09/904,490

(22) Filed: Jul. 13, 2001

(51) Int. Cl.$^7$ ............................................... B62D 17/00
(52) U.S. Cl. .......................... 403/408.1; 280/124.147; 280/124.155; 280/86.752
(58) Field of Search .............................. 403/384, 408.1; 280/124.147, 124.155, 86.752

(56) References Cited

U.S. PATENT DOCUMENTS

| | | | | |
|---|---|---|---|---|
| 4,372,575 A | * | 2/1983 | Hyma | 280/661 |
| 4,946,188 A | * | 8/1990 | Key et al. | 280/661 |
| 5,484,161 A | * | 1/1996 | McIntyre | 280/124.155 |
| D371,334 S | * | 7/1996 | Hotchkis, Jr. et al. | D12/159 |
| 5,931,485 A | * | 8/1999 | Modinger et al. | 280/86.751 |
| 6,224,075 B1 | * | 5/2001 | McIntyre | 280/86.751 |
| 6,257,601 B1 | * | 7/2001 | Spears et al. | 280/86.752 |
| 6,328,321 B1 | * | 12/2001 | Nolan | 280/86.754 |

OTHER PUBLICATIONS

BBK Fully Adjustable Caster/Camber Kits 1994–01, [Retrieved Jul. 4, 2001] Retrieved from internet, URL: www-.BrothersPerformance.com/shop/mustan/BBK2527.htm.

CCP2000 4 Caster Camber Plates, [Retrieved Jul. 4, 2001] Retrieved from Internet, URL: www.Griggsracing.com/Art/CPP2000_4.Gif.

Steeda Caster Camber Plates, [Retrieved Jul. 4, 2001], Retrieved from Internet, URL: www.Steeda.com/Store/~Catalog/Castercamber.htm.

* cited by examiner

*Primary Examiner*—Robert J. Sandy
(74) *Attorney, Agent, or Firm*—David O. Simmons

(57) ABSTRACT

One embodiment of a caster-camber plate assembly as disclosed herein includes a base plate, a main plate and a strut top mounting plate. The base plate includes four spaced apart main plate fastening members attached thereto. The main plate includes four spaced apart strut top mounting plate fastening members attached thereto. The main plate has the main plate fastening members extending therethrough for attaching the base plate adjacent to a first side of the main plate and is capable of being moved with respect to the base plate along a first translation axis. The strut top mounting plate is positioned adjacent to the main plate with the four strut top mounting plate fastening members extending therethrough. The strut top mounting plate is capable of being moved with respect to the main plate along a second translation axis. The second translation axis extends approximately perpendicular to the first translation axis. A central axis of the strut top mounting plate is positioned within an area defined between the main plate fastening members and within an area defined between said strut top mounting plate fastening members.

17 Claims, 10 Drawing Sheets

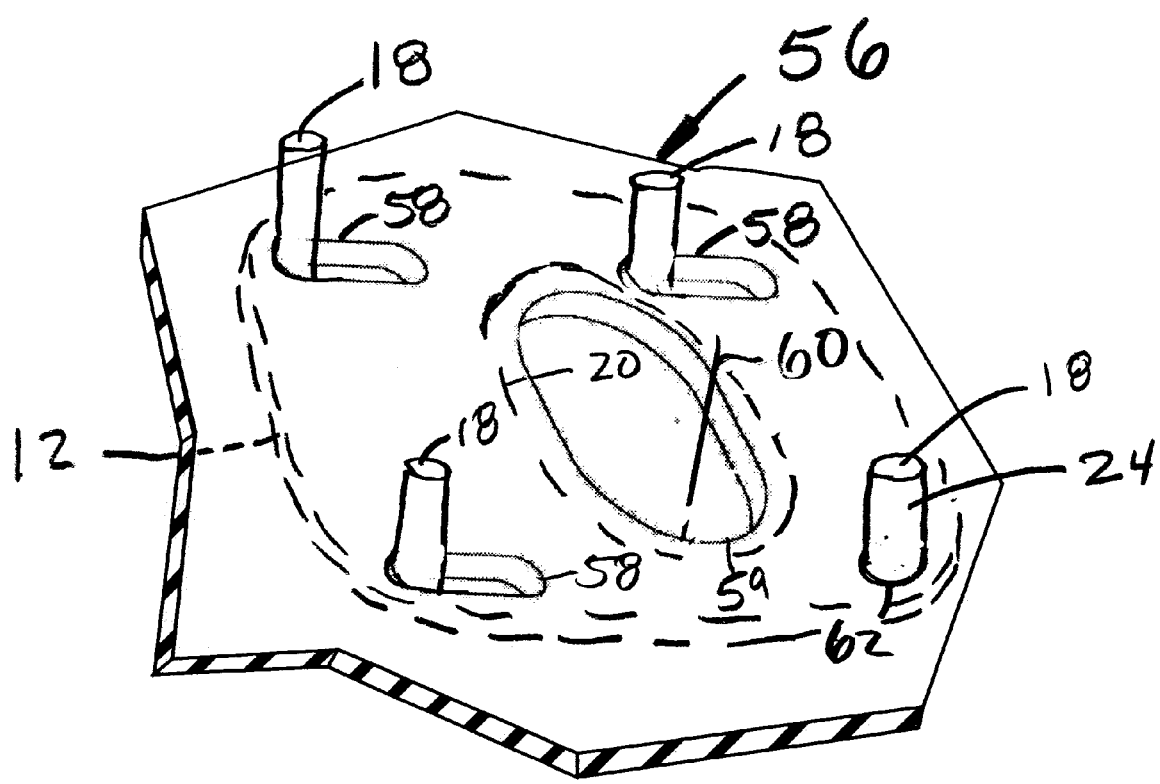

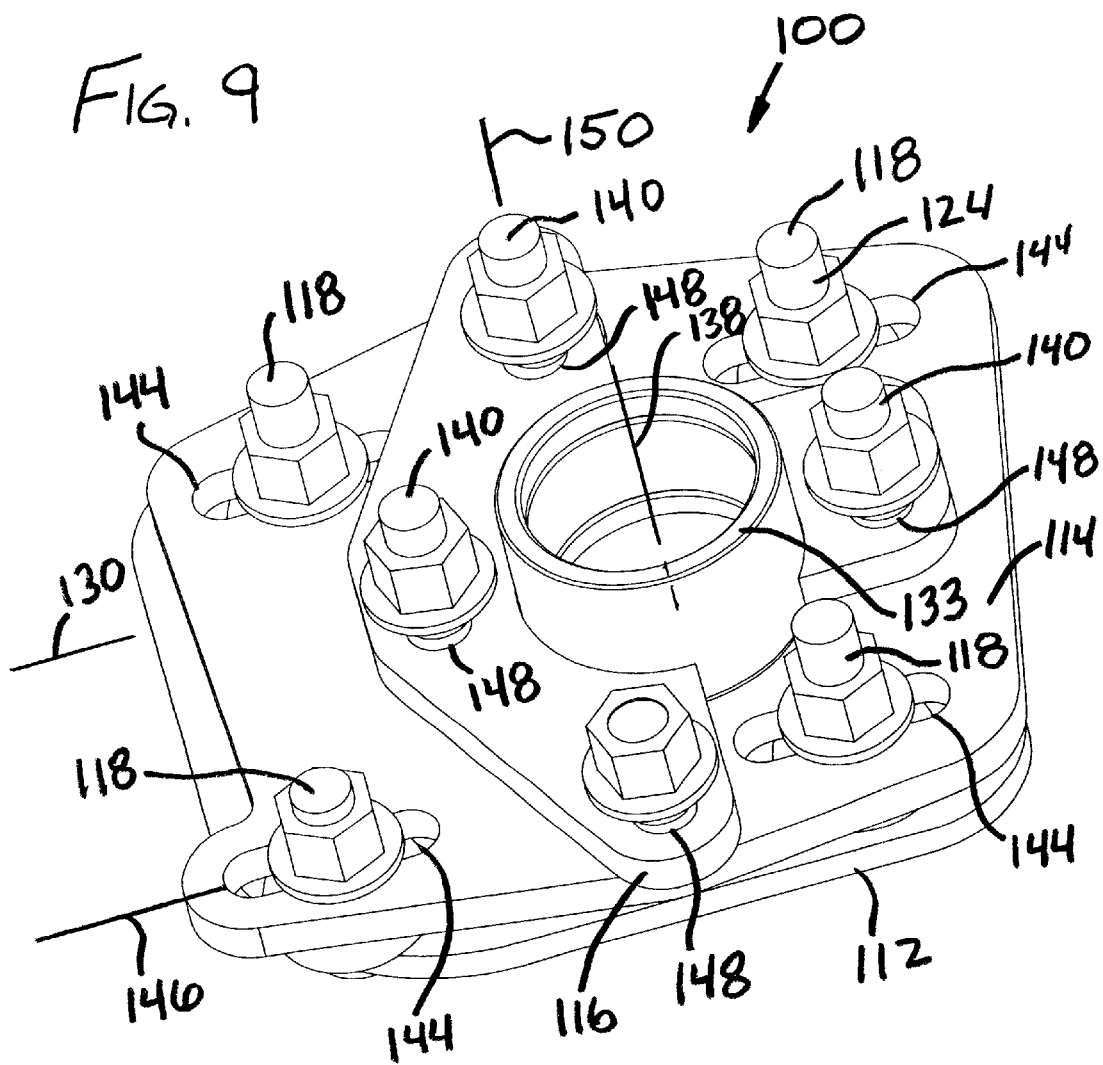

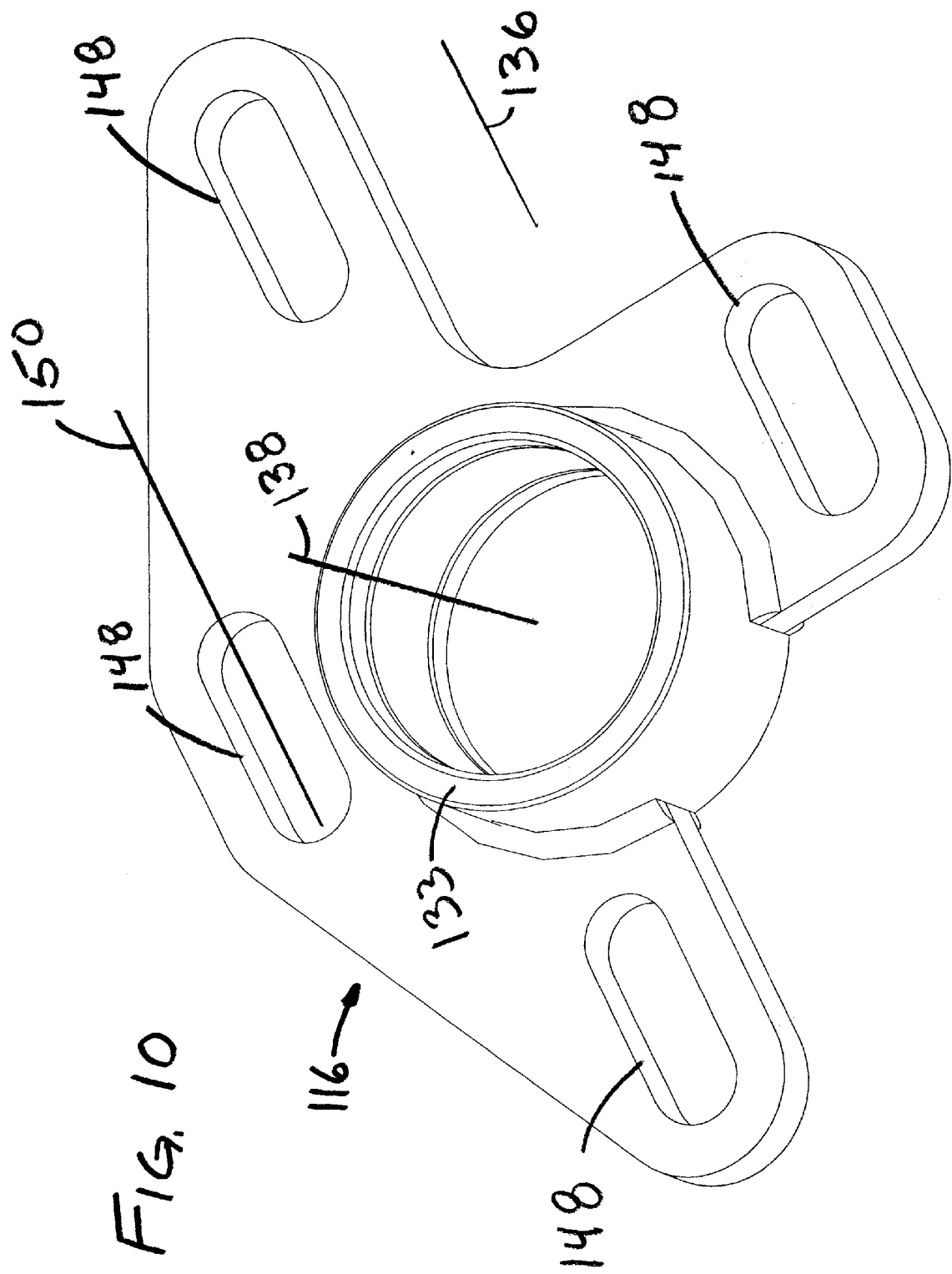

CASTER-CAMBER PLATE ASSEMBLY

FIELD OF THE DISCLOSURE

The disclosures herein relate generally to automobile suspensions and more particularly to caster-camber plate assemblies.

BACKGROUND OF THE DISCLOSURE

Many automobiles have a front suspension using a MacPherson strut arrangement or similar type of strut arrangement. In such a strut arrangement, a top mounting point of a strut is attached to an upper strut mounting assembly. The upper strut mounting assembly is attached to a strut tower of the automobile. The strut tower is a portion of the chassis of the automobile. Loads exerted on the front suspension are transmitted from a front suspension assembly, such as a control arm and a strut, to the chassis via the upper strut mounting assembly.

Factory upper strut mounting assemblies suitably attached to the strut tower often allow camber of the front suspension to be adjusted, but not caster. One arrangement for allowing camber to be adjusted is to provide slots in the strut tower and to mount the upper strut mounting assemblies to the strut towers via fasteners extending through the corresponding slots. Moving the upper strut mounting assemblies relative to the corresponding slots facilitates adjustments in camber. However, the range of adjustment for camber afforded by the slots is often insufficient for achieving desired or preferred camber settings on a lowered vehicle or a vehicle with a modified front suspension.

A caster-camber plate assembly is an example of an upper strut mounting assembly. The caster-camber plate assembly permits the caster and the camber to be adjusted. Some caster-camber plate assemblies allow the caster and camber to be adjusted independently from each other, while others permit camber and caster to be adjusted jointly. By enabling the caster and camber to be adjusted, desired or at least preferred front suspension alignment setting can be better achieved. Also, caster camber plates, such as those disclosed herein, generally provide for greater adjustment of caster and/or camber than do factory upper strut mounting assemblies.

A caster-camber plate assembly having a conventional construction suffers from one or more drawbacks. A caster camber plate assembly having a conventional construction is referred to herein as a conventional caster-camber plate assembly. Conventional caster-camber plates are commercially available from manufacturers and distributors such as Steeda Autosports, Griggs Racing, and BBK Incorporated. Examples of drawbacks associated with a conventional caster-camber plate assemblies include, but are not limited to, less than optimal strength of one or more caster-camber plate assembly components, limited clearance for a coil-over upper spring perch and complexity of installation. These limitations reduce the reliability, effectiveness and versatility of a conventional caster-camber plate assembly.

Accordingly, a caster-camber plate assembly capable of overcoming these drawbacks is useful.

BRIEF DESCRIPTION OF THE DRAWINGS

FIG. 8 is a fragmentary perspective view of the strut tower of claim 7 including a installer provided main plate fastening member aperture formed therein.

FIG. 9 is a perspective view depicting an embodiment of a caster-camber plate assembly having a 4-bolt main-plate arrangement and a 4-bolt strut top mounting plate arrangement, as disclosed herein.

FIG. 10 is a perspective view depicting an embodiment of a 4-bolt strut top mounting plate as disclosed herein.

DETAILED DESCRIPTION

Embodiments of a caster-camber plate assembly as disclosed herein provide a number of benefits over conventional caster-camber plate assemblies. For example, relative to conventional caster-camber plate assemblies, embodiments of caster-camber plate assemblies as disclosed herein provide increased strength of one or more caster-camber plate assembly components, increased clearance for a coil-over upper spring perch and provide for reduced complexity of installation. These benefits increase the reliability, effectiveness and versatility of embodiments of caster-camber plate assemblies as disclosed herein.

Figure 1:
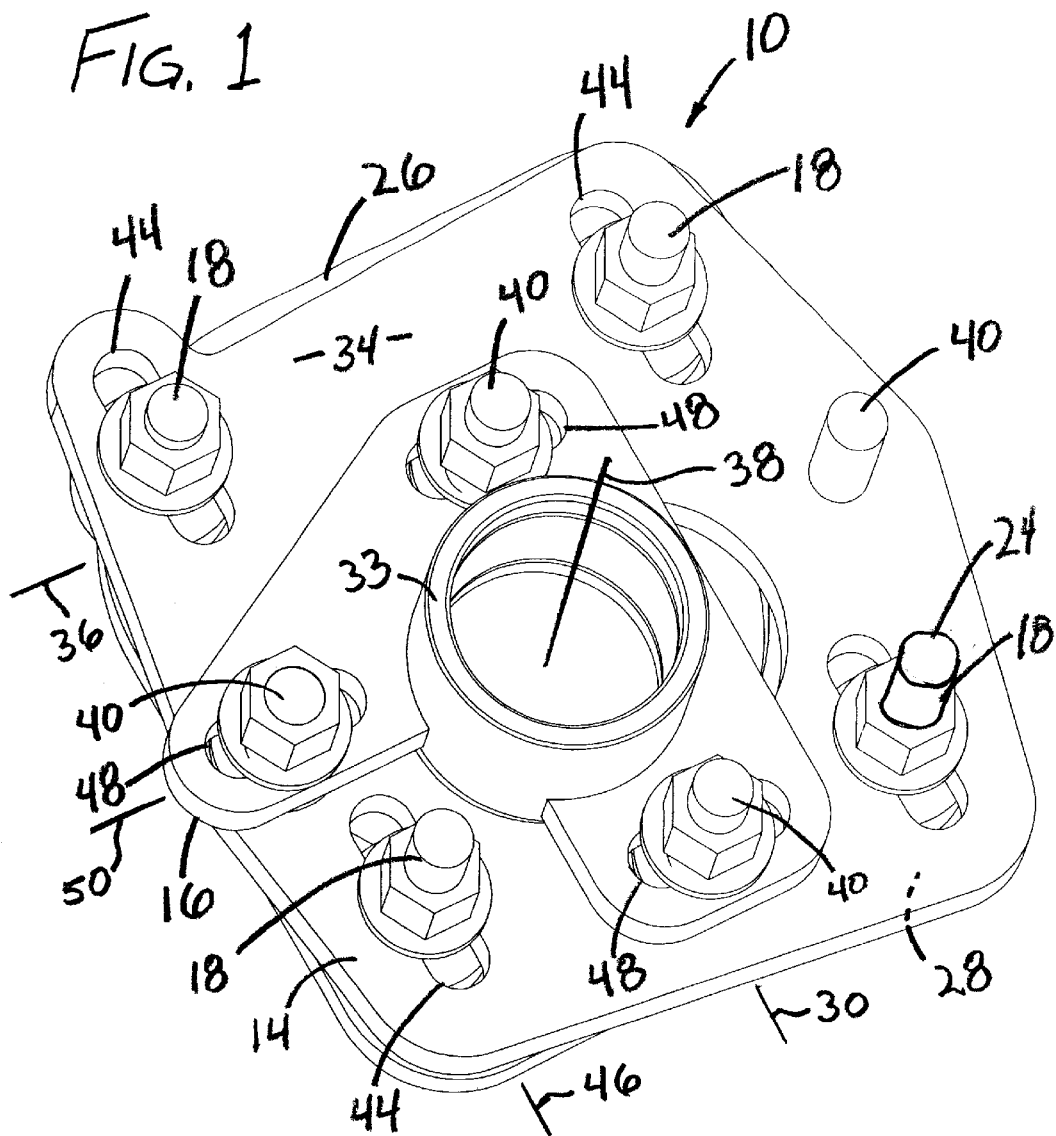
FIG. 1 is a top perspective view depicting an embodiment of a caster-camber plate assembly as disclosed herein.
Figure 2:
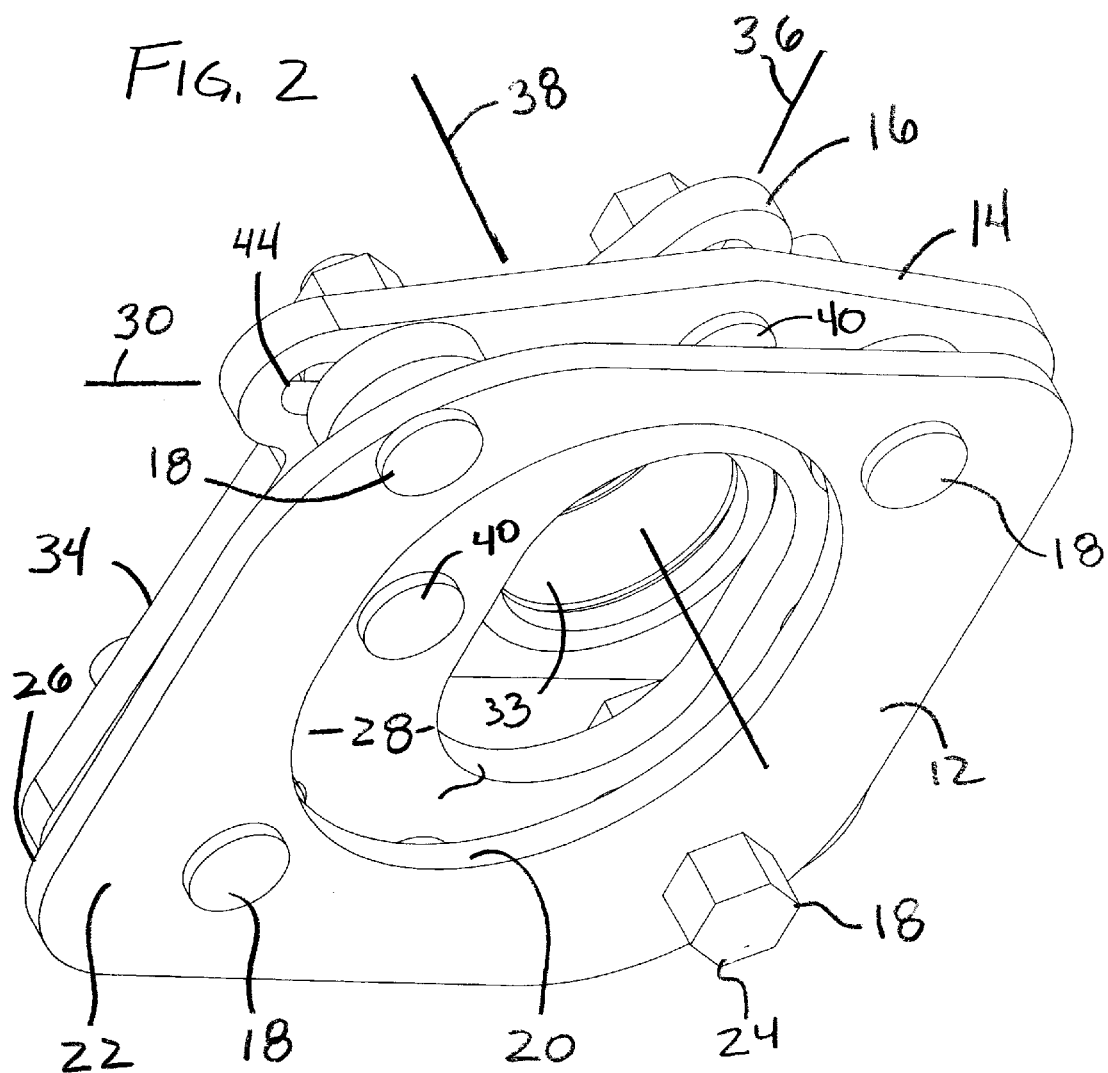
FIG. 2 is a bottom perspective view of the caster camber plate assemble depicted in FIG. 1.

An embodiment of a caster-camber plate assembly 10 is depicted in FIGS. 1 and 2. The caster-camber plate assembly 10 includes a base plate 12, a main plate 14 and a strut top mounting plate 16. The base plate 12 includes four spaced apart main plate fastening members 18 attached thereto and an aperture 20 extending therethrough. Each one of the main plate fastening members 18 extends through the base plate 12 from a first side 22 of the base plate 12. In applications where the main plate fastening members are bolts or studs, valuable space is conserved by having the heads of such fasteners adjacent to the first side of the base plate 12. At least one of the main plate fastening members 18 is a removable main plate fastening member 24, removably attached to the base plate 12.

The main plate 14 has the main plate fastening members 18 extending therethrough for attaching the base plate 12 to the main plate 14. The base plate 12 is attached to the main plate 14 with a second side 26 of the base plate 12 positioned adjacent to a first side 28 of the main plate 14. The main plate 14 is configured in a manner and attached to the base plate 12 in a manner wherein the main plate 14 is capable of being moved with respect to the base plate 12 along a first translation axis 30. In the case where a fastening member is a stud, a mating fastening member such as a nut is used in conjunction therewith.

A strut top mounting plate 16 is attached to the main plate 14 adjacent to a second side 34 of the main plate 14. The strut top mounting plate 16 is configured in a manner and attached to the base plate 14 in a manner wherein the strut top mounting plate 16 is capable of being moved with respect to the main plate 14 along a second translation axis 36. The second translation axis 36 extends approximately perpendicular to the first translation axis 30.

The strut top mounting plate 16 includes a strut top mounting member receptacle 33 attached thereto. The strut top mounting member receptacle 33 is capable of receiving a strut top mounting member. Spherical bearings, polyurethane bushings and rubber bushings are examples of the strut top mounting member. A central axis 38 of the strut top mounting plate 16 extends along a longitudinal axis of the strut top mounting member receptacle 33. The central axis 38 is positioned within an area defined between the main plate fastening members 18. The central axis extends approximately perpendicular to the first and the second translation axes 30, 36, as best depicted in FIG. 2.

Figure 3:
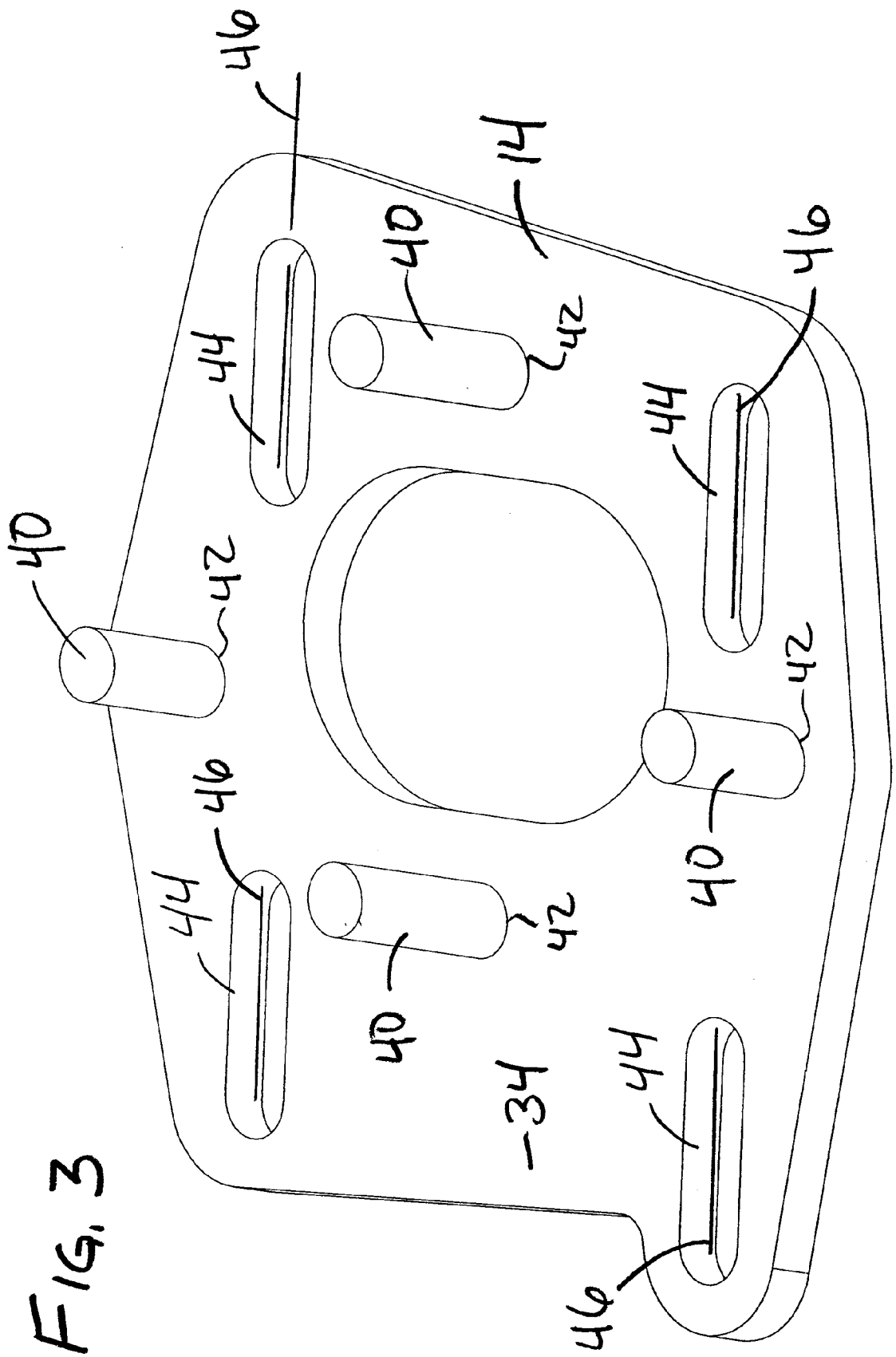
FIG. 3 is a perspective view depicting an embodiment of a main plate as disclosed herein.

Referring to FIGS. 1 to 3, the main plate includes a plurality of strut top mounting plate fastening members 40 attached thereto. The strut top mounting plate fastening members 40 are captured at the first side 28 of the main plate 14. Each one of the strut top mounting plate fastening members 40 extend from the second side 34 of the main plate 14 through a corresponding aperture 42 in the main plate 14, FIGS. 2 and 3.

The main plate 14 includes four elongated first apertures 44 therein. Each one of the elongated first apertures 44 defines a respective first longitudinal axis 46 extending generally parallel to the longitudinal axis the first translation axis 30. Each one of the main plate fastening members 18 extends through a corresponding one of the elongated first apertures 44 and is aligned with the corresponding one of the elongated first apertures 44 for permitting movement of the main plate 14 with respect to the base plate 12 along the first translation axis 30. In this manner, caster and/or camber settings of a suspension system may be adjusted via movement of the main plate 14. The orientation of the caster-camber plate assembly 10 relative to the suspension system determines whether caster and/or camber settings are adjustable via translation of the main plate relative to the base plate 12.

Figure 4:
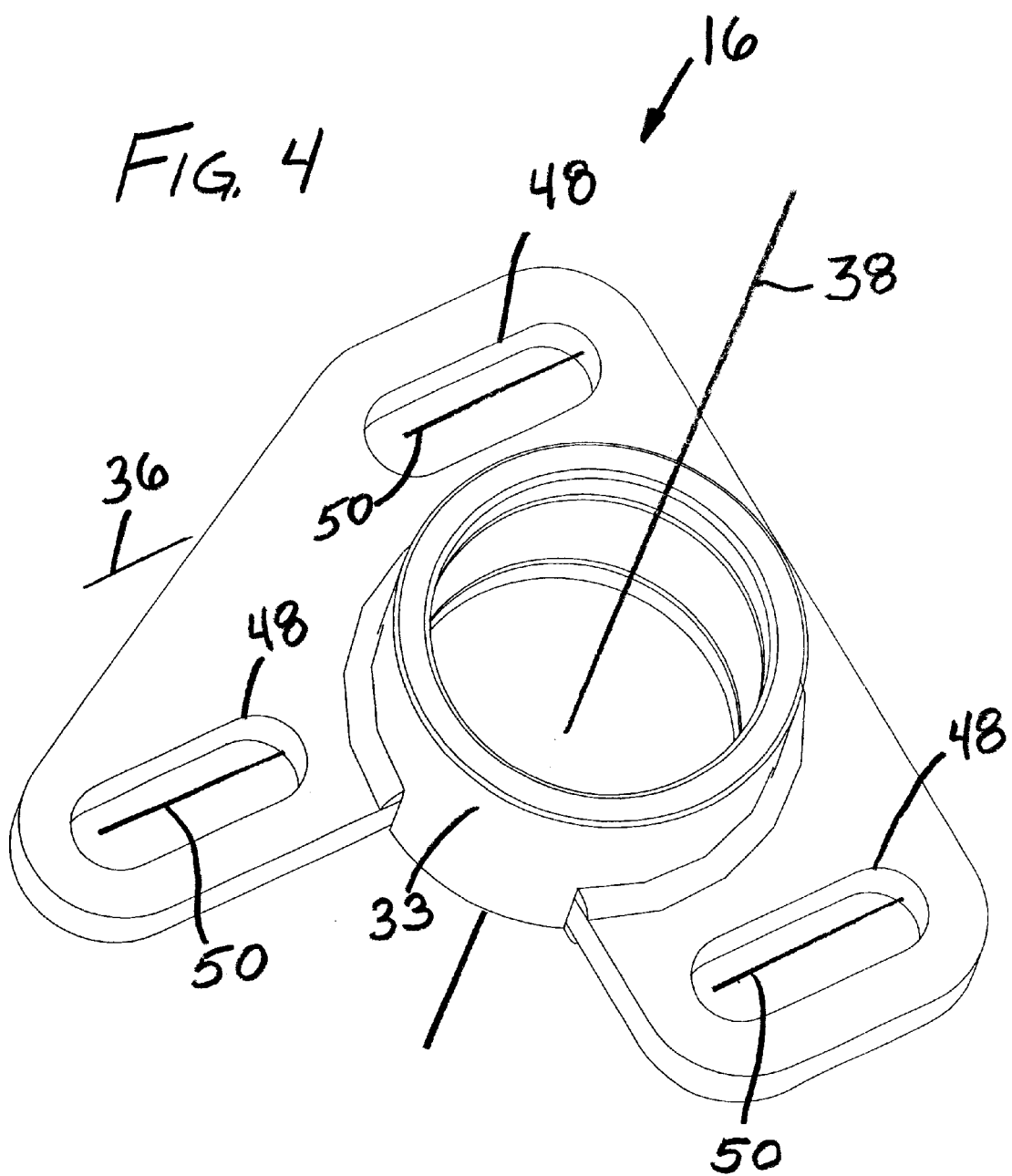
FIG. 4 is a perspective view depicting an embodiment of a 3-bolt strut top mounting plate as disclosed herein.

Referring to FIGS. 1, 2 and 4, the strut top mounting plate 16 includes three elongated second apertures 48 therein. Each one of the second elongated apertures 48 defines a respective second longitudinal axis 50 extending generally parallel to the second translation axis 36. The central axis 38 of the strut top mounting plate 16 is positioned within an area defined between the three elongated second apertures 48.

Each one of the strut top mounting plate fastening members 40 extends through a corresponding one of the elongated second apertures 48 and is aligned with the corresponding one of the elongated second apertures 48 for permitting movement of the strut top mounting plate 16 with respect to the main plate 14 along the second translation axis 36. In this manner, caster and/or camber settings of the suspension system may be adjusted via movement of the strut top mounting plate 16. The orientation of the caster-camber plate assembly 10 relative to the suspension system determines whether caster and/or camber settings are adjustable via translating the strut top mounting plate 16 relative to the main plate 14.

Figure 5:
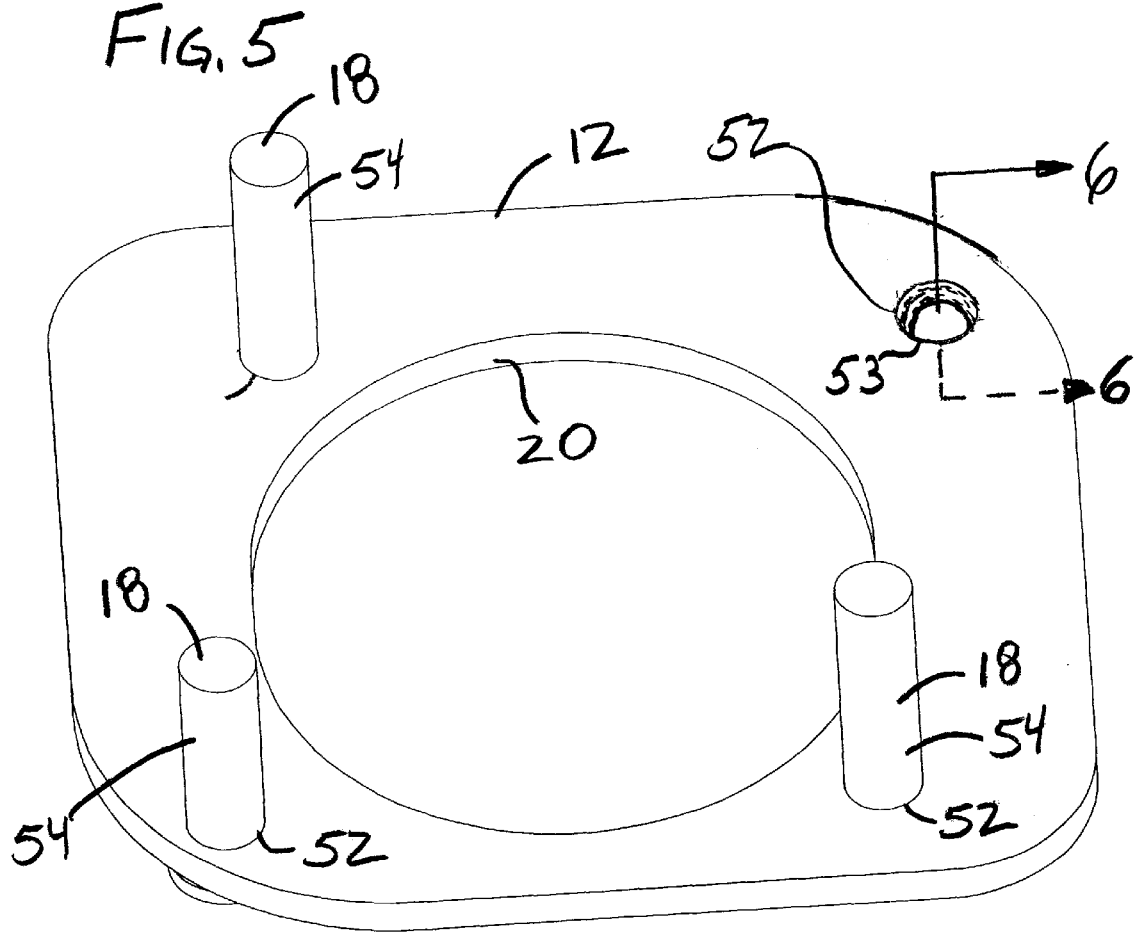
FIG. 5 is a perspective view depicting an embodiment of a base plate as disclosed herein.
Figure 6:
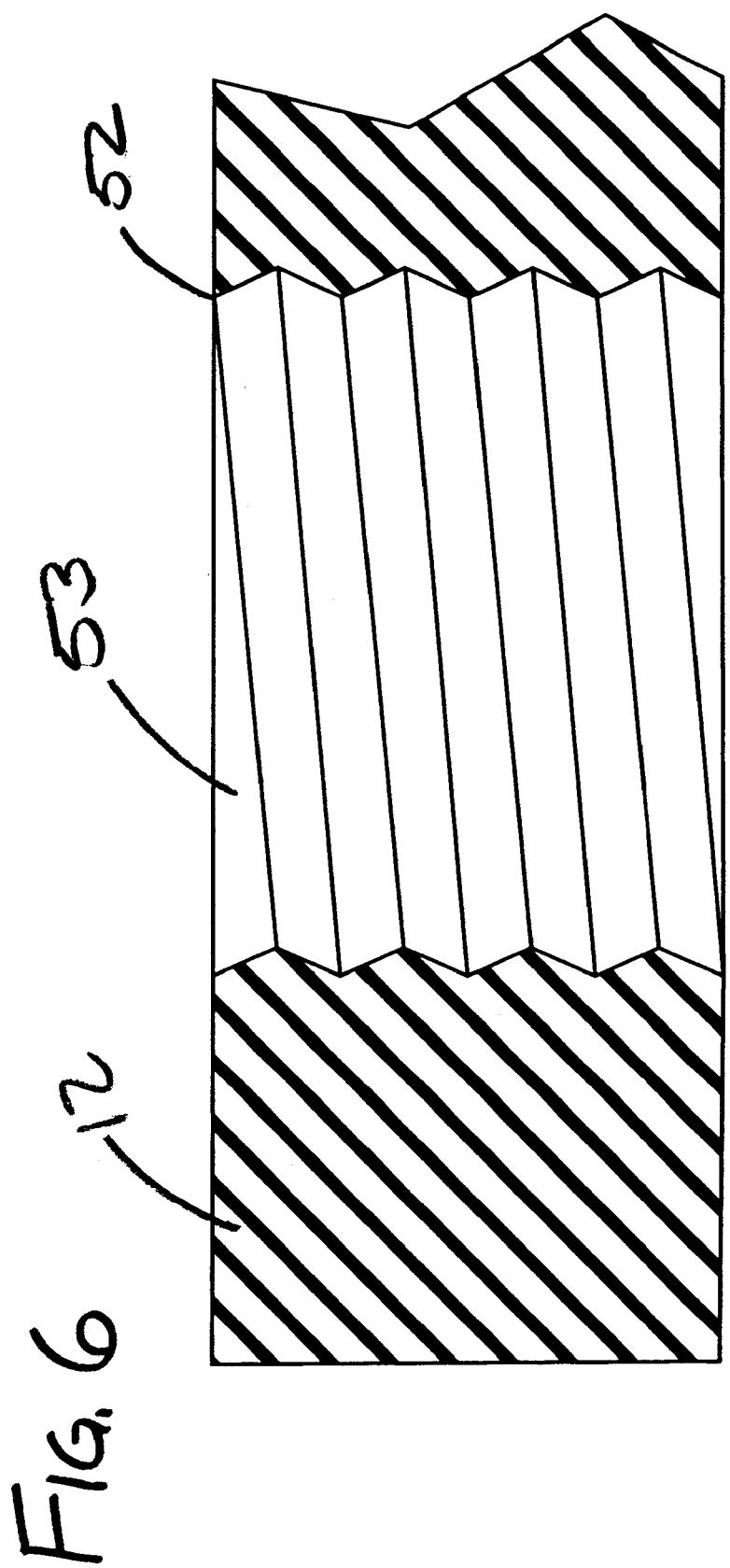
FIG. 6 is a cross-sectional view taken along the line 6—6 in FIG. 5.

Referring to FIGS. 5 and 6, the base plate 12 includes a plurality of apertures 52 therein for receiving a corresponding one of said main plate fastening members 18. One of the apertures 52 includes threads 53 therein for enabling the removable main plate fastening member 24 (FIGS. 1 and 2) to be threaded therein. The remaining three main plate fastening members 18 are fixed-position main plate fastening members 54. The fixed-position main plate fastening members 54 may or may not be removable. They are fastening members that do not need to be removed for an intended application. Pressed in studs and welded in studs or bolts are examples of the fixed-position main plate fastening members 54. However, is contemplated herein that the fixed position main plate fastening members 54 may be threaded fasteners received in threaded apertures of the base plate 12.

As an alternative to forming threads in the base plate 12, it is contemplated herein that a threaded nut may be attached (e.g. welded) to the base plate 12 adjacent to an aligned through-hole in the base plate 12 for enabling the removable main plate fastening member 24 (FIGS. 1 and 2) to be treaded therein. In such an alternative embodiment, the removable main plate fastening member 24 may be a bolt that is threaded through the base plate from the first side 22 or the second side 26 of the base plate 12. When threaded through from the second side 26, the bolt is installed after the base plate 12 and the main plate 14 are mounted in place on a strut tower.

Figure 7:
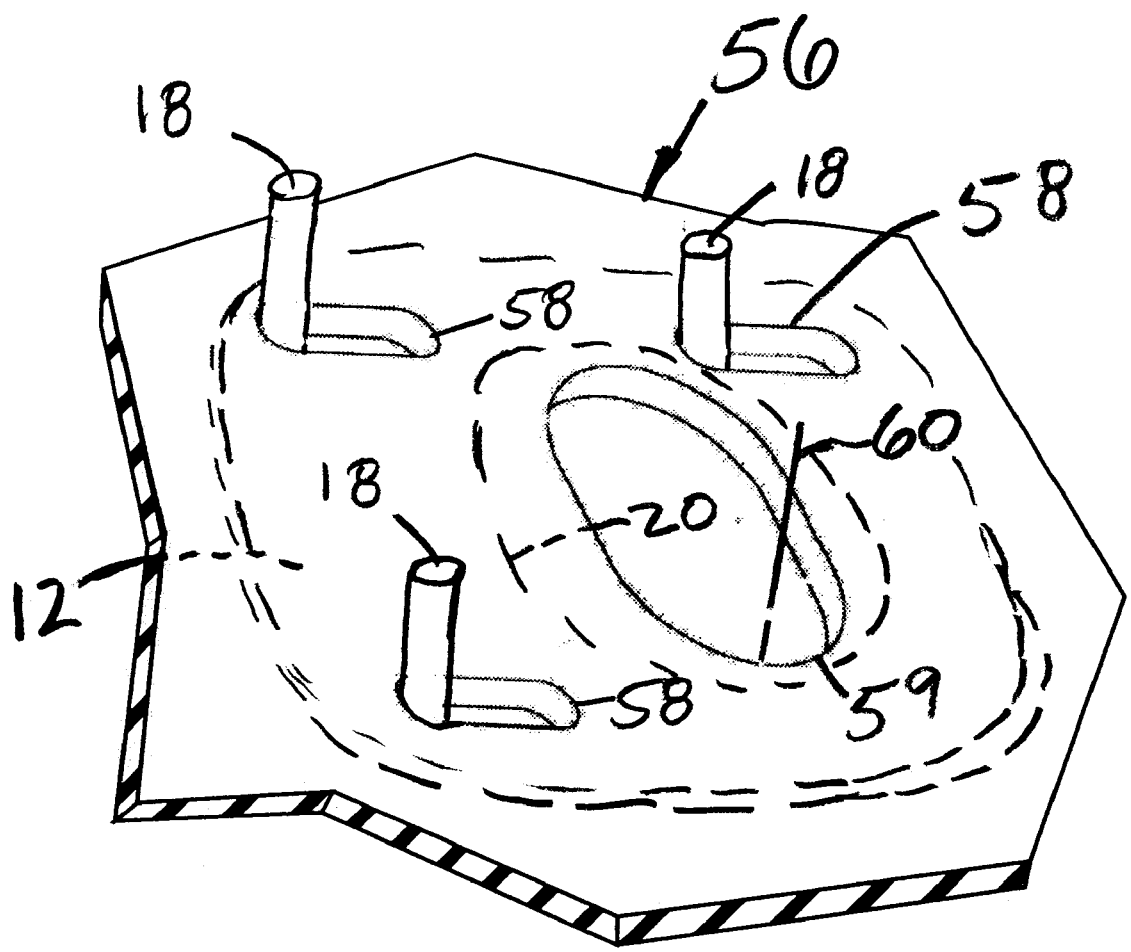
FIG. 7 is a fragmentary perspective view depicting an embodiment of a strut tower including three factory-provided strut mounting assembly apertures therein and a strut rod aperture therein.

An embodiment of a strut tower 56 including three factory-provided strut mounting assembly apertures 58 therein and a strut rod aperture 59 therein is depicted in FIG. 7. One advantage of the removable main plate fastening member 24 is that it permits the main plate 14 to be used in a 3-bolt or 4-bolt attachment configuration, depending on the specific application. For example, each one of the fixed position main plate fastening members 54 of the base plate 12 are positioned such that they are aligned with a corresponding one of the factory-provided strut mounting assembly apertures 58. Omission of the removable main plate fastening member 24 allows the base plate 12 to be mounted on the strut tower 56 with the three fixed-position main plate fastening members 54 plate extending through the corresponding one of the factory provided strut mounting assembly apertures 58. In applications where a 4-bolt main plate configuration is not necessary and/or desired, the removable main plate fastening member 24 may be removed.

As depicted in FIG. 7, a substantial portion of a strut rod aperture 59 is positioned outside of an area (i.e. a triangular area) defined between the three factory-provided main plate fastening member apertures 58. In some instances, the design of a suspension or a desired alignment setting result in a central axis 60 of a strut (i.e. the central axis 38 of the strut top mounting plate 16) to fall outside of the area defined between the three factory-provided main plate fastening member apertures 58. In such instances, a strut top mounting assembly can be under an undesirable bending load when attached to the strut tower via only the three factory-provided main plate fastening member apertures 58. The installation of a coil-over assembly significantly increases loads applied to the chassis directly through the strut mounting assembly (e.g. caster-camber plate assembly). Accordingly, the strut top mounting assembly may fail or not function as intended or desired.

As depicted in FIG. 8, an installer-provided main plate fastening member aperture 62 is formed in the strut tower 56 for enabling the caster-camber plate assembly 10, FIGS. 1 and 2, to be attached to the strut tower 56 using the four main plate fastening members 18. By installer-provided, it is meant that a person who is installing a caster-camber plate assembly as disclosed herein provides a specified aperture. Drilling a hole is an example of forming the installer-provided main plate fastening member aperture 62. The installer-provided main plate fastening member aperture 62 is positioned such that the central axis 60 of the strut is positioned within an area defined jointly between the factory-provided main plate fastening member apertures 58 and the installer-provided main plate fastening member aperture 62, regardless of the alignment setting. Accordingly, the caster-camber plate assembly 10 is not under an under an undesirable bending load when attached to the strut tower via the four main plate fastening members 18.

Another advantage of the removable main plate fastening member 18 is that removal of the main plate fastening member 18 permits the base plate 12 to be used as a template for locating the position of the installer-provider main plate fastening member aperture 62. When the removable main plate fastening member 24 is properly positioned with respect to the fixed-position main plate fastening members 54, the base plate 12 can be positioned on the strut tower with each one of the fixed-position main plate mounting fasteners 54 extending through the corresponding one of the factory-provided main plate fastening member apertures 58. In this manner, the aperture 52 configured for receiving the removable main plate fastening member 24 identifies the position for the installer-provided main plate fastening member aperture 62.

An embodiment of a caster-camber plate assembly 100 having a 4-bolt main-plate arrangement as discussed above and a 4-bolt strut top mounting plate arrangement is depicted in FIG. 9. The caster-camber plate assembly 100 includes a base plate 112, a main plate 114 and a strut top mounting plate 116. The base plate 112 includes four main plate fastening members 118 attached thereto. One of the four main plate fastening members 118 is a removable main plate fastening member 124, as disclosed above in reference to FIGS. 1,2,5 and 6. The main plate 114 includes four strut top mounting plate fastening members 140 attached thereto.

The main plate 114 includes four elongated first apertures 144 therein. Each one of the elongated first apertures 144 defines a respective first longitudinal axis 146 extending generally parallel to a first translation axis 130. Each one of the main plate fastening members 118 extends through a corresponding one of the elongated first apertures 144 and is aligned with the corresponding one of the elongated first apertures 144 for permitting movement of the main plate 114 with respect to the base plate 112 along the first translation axis 130. In this manner, caster and/or camber settings of a suspension system may be adjusted via movement of the main plate 114. The orientation of the caster-camber plate assembly 100 relative to the suspension system determines whether caster and/or camber are adjustable via translating the main plate relative to the base plate 112.

Referring to FIGS. 9 and 10, the strut top mounting plate 116 includes four elongated second apertures 148 therein and a strut top mounting member receptacle 133 capable of receiving a strut top mounting member. A central axis 138 of the strut top mounting plate 116 extends along a longitudinal axis of the strut top mounting member receptacle 133. Each one of the second elongated apertures 148 defines a respective second longitudinal axis 150 extending generally parallel to the second translation axis 136. The central axis 138 of the strut top mounting member receptacle 116 is positioned within an area defined between the four elongated second apertures 148.

Each one of the four strut top mounting plate fastening members 140 extends through a corresponding one of the elongated second apertures 148 and is aligned with the corresponding one of the elongated second apertures 148 for permitting movement of the strut top mounting plate 116 with respect to the main plate 114 along the second translation axis 136. In this manner, caster and/or camber settings of the suspension system may be adjusted via movement of the strut top mounting plate 116. The orientation of the caster-camber plate assembly 100 relative to the suspension system determines whether caster and/or camber are adjustable via translating the strut top mounting plate 116 relative to the main plate 114.

Attaching the strut top mounting plate 116 to the main plate 114 via the four strut top mounting plate fastening members 140 provides a number of benefits. One benefit is that the central axis 138 of the strut top mounting plate can be positioned between the four strut top mounting plate fastening members 140. Accordingly, the strut top mounting plate 116 is not subjected to any significant bending loads, thus reducing the potential for failure of the strut top mounting plate 116 and allowing an installed strut top mounting member to operate more effectively. Another benefit is that the strut top mounting plate 116 has less tendency to pivot and/or bind during adjustment. It is advantageous to spread an applied load into plate 114, thus reducing bending load in plate 114. The main plate 114 and the strut top mounting plate 116 are tied together to form a truss which significantly increases the bending strength of the main plate 114 for a given load.

The base plate 12, the main plate 14 and the strut top plate 16 may be made from commercially available materials and fabricated using known processes. Examples of commercially available materials include aluminum and steel plate and sheet material. Examples of known processes include cutting, welded, punching, blanking, turning, drilling, milling, laser cutting, water jet cutting, plating, anodizing and the like.

One embodiment of a caster-camber plate assembly as disclosed herein includes a base plate, a main plate and a strut top mounting plate. The base plate includes four spaced apart main plate fastening members attached thereto. The main plate includes four spaced apart strut top mounting plate fastening members attached thereto. The main plate has the main plate fastening members extending therethrough for attaching the base plate adjacent to a first side of the main plate and is capable of being moved with respect to the base plate along a first translation axis. The strut top mounting plate is positioned adjacent to the main plate with the four strut top mounting plate fastening members extending therethrough. The strut top mounting plate is capable of being moved with respect to the main plate along a second translation axis. The second translation axis extends approximately perpendicular to the first translation axis. A central axis of the strut top mounting plate is positioned within an area defined between the main plate fastening members and within an area defined between said strut top mounting plate fastening members.

Another embodiment of a caster-camber plate assembly as disclosed herein includes a base plate, a main plate and a strut top mounting plate. The base plate includes four spaced apart main plate fastening members attached thereto. The main plate has the main plate fastening members extending therethrough for attaching the base plate adjacent to a first side of the main plate and is capable of being moved with respect to the base plate along a first translation axis. The strut top mounting plate is attached to the main plate adjacent to a second side of the main plate and is capable of being moved with respect to the main plate along a second translation axis. The second translation axis extends approximately perpendicular to the first translation axis. A central axis of the strut top mounting plate is positioned within an area defined between the main plate fastening members. Each one of the main plate fastening members extends through the base plate from a first side of the base plate and at least one of the main plate fastening members is removably attached to the base plate.

Still another embodiment of a caster-camber plate assembly as disclosed herein includes a base plate, a main plate and a strut top mounting plate. The main plate includes four elongated first apertures therein and four strut top mounting plate fastening members attached thereto. Each one of the elongated first apertures defines a respective first longitudinal axis extending generally parallel to a first translation axis. A base plate is positioned adjacent to a first side of the main plate and includes four main plate fastening members. Each one of the main plate fastening members extends through a corresponding one of the elongated first apertures and being aligned with the corresponding one of the elongated first apertures for permitting movement of the main plate with respect to the base plate along the first translation axis. The strut top mounting plate is positioned adjacent to the second side of the main plate and includes four elongated second apertures therein. Each one of the second elongated apertures defines a respective second longitudinal axis extending generally parallel to a second translation axis and approximately perpendicular to the first translation axis. Each one of the elongated second apertures has a corresponding one of the strut top mounting plate fastening members extending therethrough. Each one of the elongated second apertures is aligned with the corresponding one of the strut top mounting plate fastening members for permitting movement of the strut top mounting plate with respect to the main plate along the second translation axis. A central axis of the strut top mounting plate is positioned within an area defined between said main plate fastening members.

Yet another embodiment of a caster-camber plate assembly as disclosed herein includes a base plate, a main plate and a strut top mounting plate. The base plate includes four spaced apart main plate fastening members attached thereto. The plate includes four spaced apart strut top mounting plate fastening members attached thereto. The main plate has the main plate fastening members extending therethrough for attaching the base plate adjacent to a first side of the main plate and is capable of being moved with respect to the base plate along a first translation axis. The strut top mounting plate is positioned adjacent to the main plate with the four strut top mounting plate fastening members extending therethrough. The strut top mounting plate is capable of being moved with respect to the main plate along a second translation axis. The second translation axis extends approximately perpendicular to the first translation axis. A central axis of the strut top mounting plate is positioned within an area defined between the main plate fastening members and within an area defined between the strut top mounting plate fastening members.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A caster-camber plate assembly, comprising:
   a base plate including four spaced apart main plate fastening members attached thereto;
   a main plate having said main plate fastening members extending therethrough for attaching the base plate adjacent to a first side of the main plate and is capable of being moved with respect to the base plate along a first translation axis;
   a strut top mounting plate attached to the main plate adjacent to a second side of the main plate and capable of being moved with respect to the main plate along a second translation axis, the second translation axis extending approximately perpendicular to the first translation axis, a central axis of the strut top mounting plate is positioned within an area defined between said main plate fastening members; and
   wherein each one of said main plate fastening members extends through the base plate from a first side of the base plate and at least one of said main plate fastening members is removably attached to the base plate.

2. The caster-camber plate assembly of claim 1 wherein three of said main plate fastening members are fixedly attached to the base plate and one of said main plate fastening members is removably attached to the base plate.

3. The caster-camber plate assembly of claim 1 wherein:
   the main plate includes a plurality of strut top mounting plate fastening members attached thereto;
   the strut top mounting plate includes three elongated second apertures therein, each one of said apertures having a corresponding one of said strut top mounting plate fastening members extending therethrough; and
   the central axis of the strut top mounting member is positioned within an area defined between said three elongated second apertures.

4. The caster-camber plate assembly of claim 1 wherein:
   the main plate includes a plurality of strut top mounting plate fastening members attached thereto;
   the strut top mounting plate includes four elongated second apertures therein, each one of said apertures having a corresponding one of said strut top mounting plate fastening members extending therethrough; and
   the central axis of the strut top mounting member is positioned within an area defined between said four elongated second apertures.

5. The caster-camber plate assembly of claim 1, wherein:
   the main plate includes four elongated first apertures therein, each one of said elongated first apertures defining a respective first longitudinal axis extending generally parallel to the first translation axis, each one of said main plate fastening members extending through a corresponding one of the elongated first apertures and being aligned with the corresponding one of the elongated first apertures for permitting movement of the main plate with respect to the base plate along the first translation axis.

6. The caster-camber plate assembly of claim 1 wherein:
   the strut top mounting plate includes a plurality of elongated second apertures therein, each one of said second elongated apertures defining a respective second longitudinal axis extending generally parallel to the second translation axis, each one of said elongated second apertures having a corresponding one of said strut top mounting plate fastening members extending therethrough and being aligned with the corresponding one of the strut top mounting plate fastening members for permitting movement of the strut top mounting plate with respect to the main plate along the second translation axis.

7. A caster-camber plate assembly, comprising:
a base plate including four spaced apart main plate fastening members attached thereto;
a main plate having said main plate fastening members extending therethrough for attaching the base plate adjacent to a first side of the main plate, the main plate includes four strut top mounting plate fastening members attached thereto and is capable of being moved with respect to the base plate along a first translation axis;
a strut top mounting plate having said strut top mounting plate fastening members extending therethrough for attaching the strut top mounting plate adjacent to a second side of the main plate and is capable of being moved with respect to the main plate along a second translation axis, the second translation axis extending approximately perpendicular to the first translation axis, a central axis of the strut top mounting plate is positioned within an area defined between said main plate fastening members; and
wherein each of said main plate fastening members extends through the base plate from a first side of the base plate, three of said main plate fastening members are fixedly attached to the base plate and one of said main plate fastening members is removably attached to the base plate.

8. The caster-camber plate assembly of claim 7, wherein: the main plate includes four elongated first apertures therein, each one of said elongated first apertures defining a respective first longitudinal axis extending generally parallel to the first translation axis, each one of said main plate fastening members extending through a corresponding one of the elongated first apertures and being aligned with the corresponding one of the elongated first apertures for permitting movement of the main plate with respect to the base plate along the first translation axis.

9. The caster-camber plate assembly of claim 8 wherein: the strut top mounting plate including a plurality of elongated second apertures therein, each one of said second elongated apertures defining a respective second longitudinal axis extending generally parallel to the second translation axis, each one of said elongated second apertures having a corresponding one of said strut top mounting plate fastening members extending therethrough and being aligned with the corresponding one of the strut top mounting plate fastening members for permitting movement of the strut top mounting plate with respect to the main plate along the second translation axis.

10. A caster-camber plate assembly, comprising:
a main plate including four elongated first apertures therein and four strut top mounting plate fastening members attached thereto, each one of said elongated first apertures defining a respective first longitudinal axis extending generally parallel to a first translation axis;
a base plate positioned adjacent to a first side of the main plate and including four main plate fastening members, each one of said main plate fastening members extending through a corresponding one of said elongated first apertures and being aligned with the corresponding one of said elongated first apertures for permitting movement of the main plate with respect to the base plate along the first translation axis;
a strut top mounting plate positioned adjacent to the second side of the main plate and including four elongated second apertures therein, each one of said second elongated apertures defining a respective second longitudinal axis extending generally parallel to a second translation axis and approximately perpendicular to the first translation axis, each one of said elongated second apertures having a corresponding one of said strut top mounting plate fastening members extending therethrough and being aligned with the corresponding one of the strut top mounting plate fastening members for permitting movement of the strut top mounting plate with respect to the main plate along the second translation axis, a central axis of the strut top mounting plate is positioned within an area defined between said main plate fastening members.

11. The caster-camber plate assembly of claim 10 wherein each one of said main plate fastening members extends through a corresponding one of said main plate fastening member aperture from a first side of the base plate.

12. The caster camber plate assembly of claim 10 wherein at least one of said main plate fastening members is removably attached to the base plate.

13. A caster-camber plate assembly, comprising:
a base plate including four spaced apart main plate fastening members attached thereto;
a main plate including four spaced apart strut top mounting plate fastening members attached thereto, the main plate having said main plate fastening members extending therethrough for attaching the base plate adjacent to a first side of the main plate and is capable of being moved with respect to the base plate along a first translation axis;
a strut top mounting plate positioned adjacent to a second side of the main plate with the four strut top mounting plate fastening members extending therethrough, the strut top mounting plate capable of being moved with respect to the main plate along a second translation axis, the second translation axis extending approximately perpendicular to the first translation axis, a central axis of the strut top mounting plate is positioned within an area defined between said main plate fastening members and within an area defined between said strut top mounting plate fastening members.

14. The caster-camber plate assembly of claim 13 wherein each of said main plate fastening members extends through a corresponding aperture in the base plate from a first side of the base plate.

15. The caster-camber plate assembly of claim 13 wherein three of said main plate fastening members are fixedly attached to the base plate and one of said main plate fastening members is removably attached to the base plate.

16. The caster-camber plate assembly of claim 13, wherein:
the main plate includes four elongated first apertures therein, each one of said elongated first apertures defining a respective first longitudinal axis extending generally parallel to the first translation axis, each one of said main plate fastening members extending through a corresponding one of the elongated first apertures and being aligned with the corresponding one of the elongated first apertures for permitting movement of the main plate with respect to the base plate along the first translation axis.

17. The caster-camber plate assembly of claim 13 wherein:

the strut top mounting plate including four elongated second apertures therein, each one of said second elongated apertures defining a respective second longitudinal axis extending generally parallel to the second translation axis, each one of said elongated second apertures having a corresponding one of said strut top mounting plate fastening members extending therethrough and being aligned with the corresponding one of the strut top mounting plate fastening members for permitting movement of the strut top mounting plate with respect to the main plate along the second translation axis.

* * * * *